United States Patent [19]

Trautmann

[11] 4,283,981
[45] Aug. 18, 1981

[54] INDEXING MECHANISM FOR TOOL HEAD

[75] Inventor: Hugh M. Trautmann, Evans City, Pa.

[73] Assignee: Billco Manufacturing, Inc., Zelienople, Pa.

[21] Appl. No.: 99,887

[22] Filed: Dec. 3, 1979

[51] Int. Cl.³ .............................................. B26D 3/08
[52] U.S. Cl. ...................................... 83/884; 83/886; 83/425.2; 83/499
[58] Field of Search ...................... 83/884, 883, 425.2, 83/499, 498, 504, 508.1, 508.2, 508.3, 886, 879; 33/32 E

[56] References Cited

U.S. PATENT DOCUMENTS

| | | | |
|---|---|---|---|
| 3,424,357 | 1/1969 | Curtze et al. | 83/879 X |
| 3,515,020 | 6/1970 | Dryon | 83/884 |
| 3,786,705 | 1/1974 | Dorfel | 83/504 X |
| 3,834,258 | 9/1974 | Zumstein | 83/508.3 X |
| 3,882,764 | 5/1975 | Johnson | 83/499 X |
| 4,125,076 | 11/1978 | Dorfel et al. | 83/499 X |
| 4,170,159 | 10/1979 | McNally | 83/499 X |

Primary Examiner—J. M. Meister
Attorney, Agent, or Firm—Webb, Burden, Robinson & Webb

[57] ABSTRACT

Apparatus for treating sheet or continuous ribbon material including a table with idler rolls to support the material to be treated, a drive roll to move the material over the table and vertical guide rolls at an edge of the table. An elongated beam extending across and spaced above the table and a track extending along the length of the beam. Adjustable carrier heads supported on the track for movement along the length of the beam across the table and each carrier head having a bracket to support apparatus for treating the material as the material passes over the table. A drive mechanism independently engageable with each carrier head to individually move that head along the track to position the head along the beam over the table, and a counter and indicator connected with the drive mechanism to measure the distance each head is moved along the track over the table to accurately position each head relative to the table.

7 Claims, 7 Drawing Figures

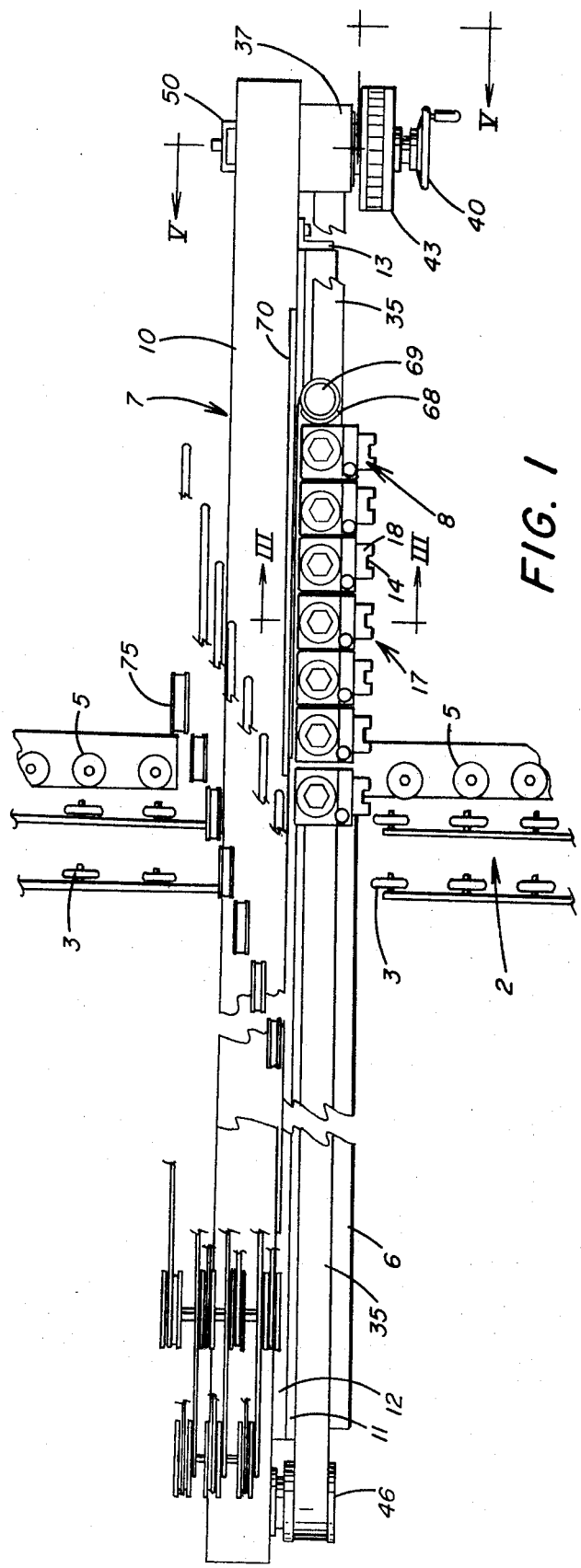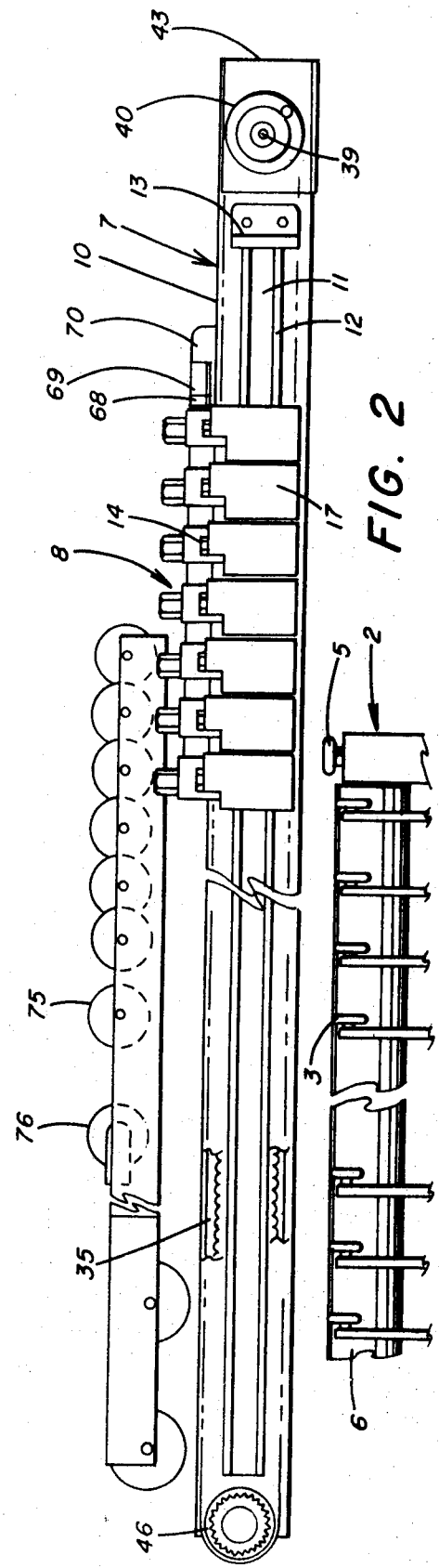

INDEXING MECHANISM FOR TOOL HEAD

For many applications sheet material must be treated for further applications. For example, glass sheet is cut into elongated strips of predetermined widths by moving the sheet along a cutting table past stationary cutters in a direction parallel to the length of the strips. In such an apparatus individual carrier heads carry the cutters which are positioned along a support member extending transversely to the direction of movement of the sheet material. The cutters are located at predetermined positions relative to the table so that the spaces between adjacent cutters correspond to the desired widths of the strips.

In the present apparatus the operator serially positions the carrier heads along a support member manually and adds the width dimensions of adjacent strips to arrive at the proper location for each adjacent carrier head transversely of the table. Each head is moved on the support member to a position as indicated by a scale on the support member or by a direct measurement of the distance along the support member and then locked in place. This method of adjustment is time consuming and is subject to operator error in calculating the position of each head. Additionally, the error is cumulative since incorrect positioning of one carrier head is transmitted to the position of each subsequent carrier head.

My invention eliminates errors caused by incorrectly calculating or measuring the location of the individual carrier heads along the support member and by inaccurately positioning the heads. Additionally, my invention permits rapid positioning of the heads at the proper predetermined locations. My invention was originally designed to cut glass sheets or ribbons into strips, but will be understood by those skilled in the art that may invention may be used for locating carrier heads for other apparatus such as tools, markers or sensors along a support member such as a beam where the locations of subsequently positioned carrier heads are referenced to each other.

My invention is described hereinafter in connection with the drawings in which:

FIG. 1 is a schematic plan view of the invention mounted on a table with parts broken away;

FIG. 2 is a schematic elevation view of the structure shown in FIG. 1;

My invention is used with a table which is part of a conveyor line over which material is passed. As the material passes over the table, it is subject to treatment such as cutting or marking. The table 2 which is partially shown in FIGS. 1 and 2 has idler rolls 3 over which the material passes and vertical rolls 5 which contact the edge of the material and guide the material as it passes over the table. A drive roll 6 extends substantially across the width of the table to continuously move material over the table. The table and the support frame for idler rolls 3, guide rolls 5 and drive roll 6 are known in the art and form no part of my invention.

Figure 5:
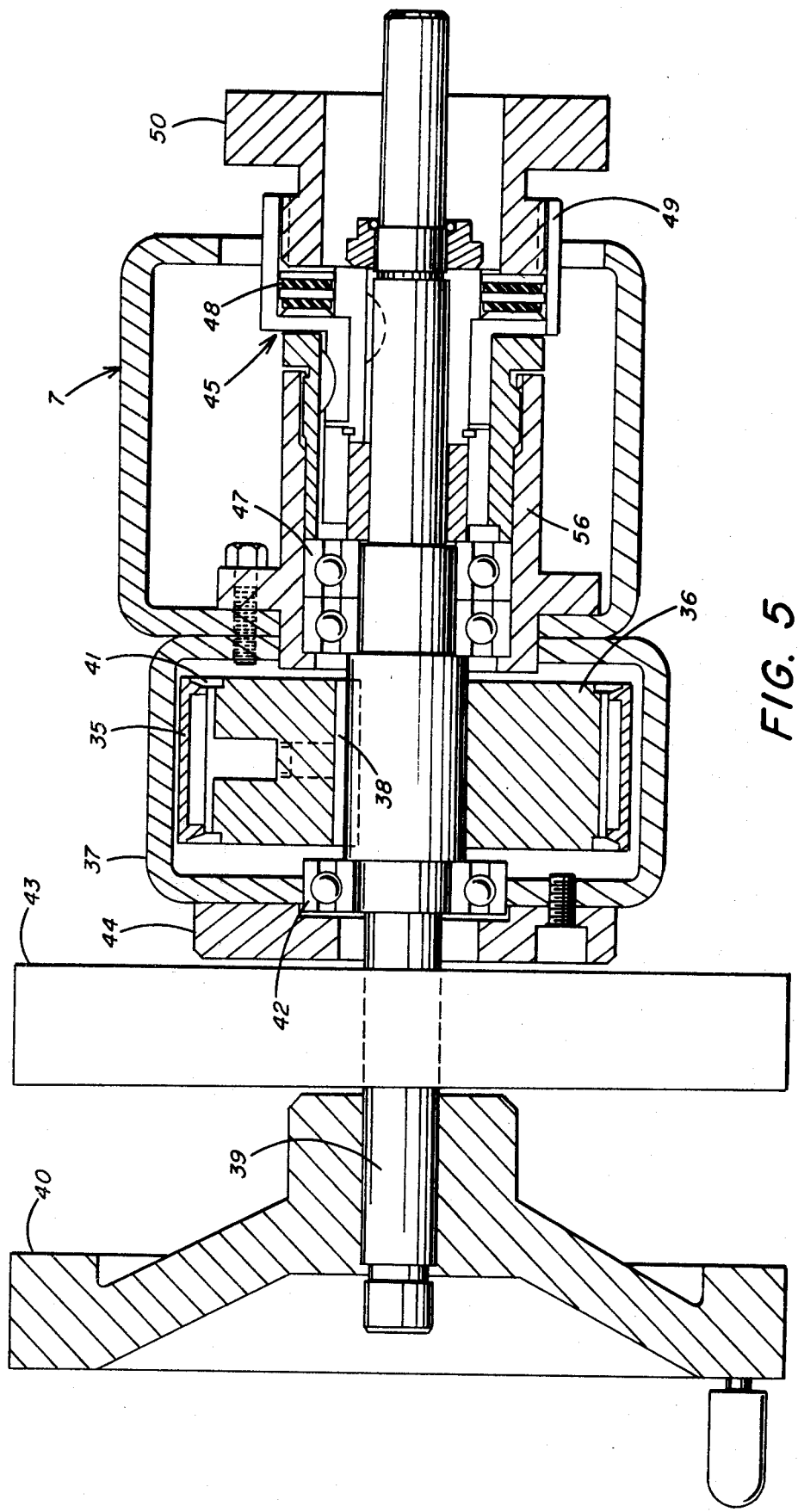
FIG. 5 is a section on line V—V of FIG. 1.

A beam 7 extends completely across table 2 to support adjustable carrier heads 8 which are adapted to carry apparatus for treating material passing over the table. The beam extends past the edge of the table carrying guide roll 2 in a cantilever manner to form a beam storage section 10 where carrier heads which are not in use are stored. Beam 7 is hollow and, as shown in FIG. 5, accommodates a clutch and brake assembly at the end of storage section 10 for locking a belt drive sheave for a purpose to be described hereinafter.

Figure 3:
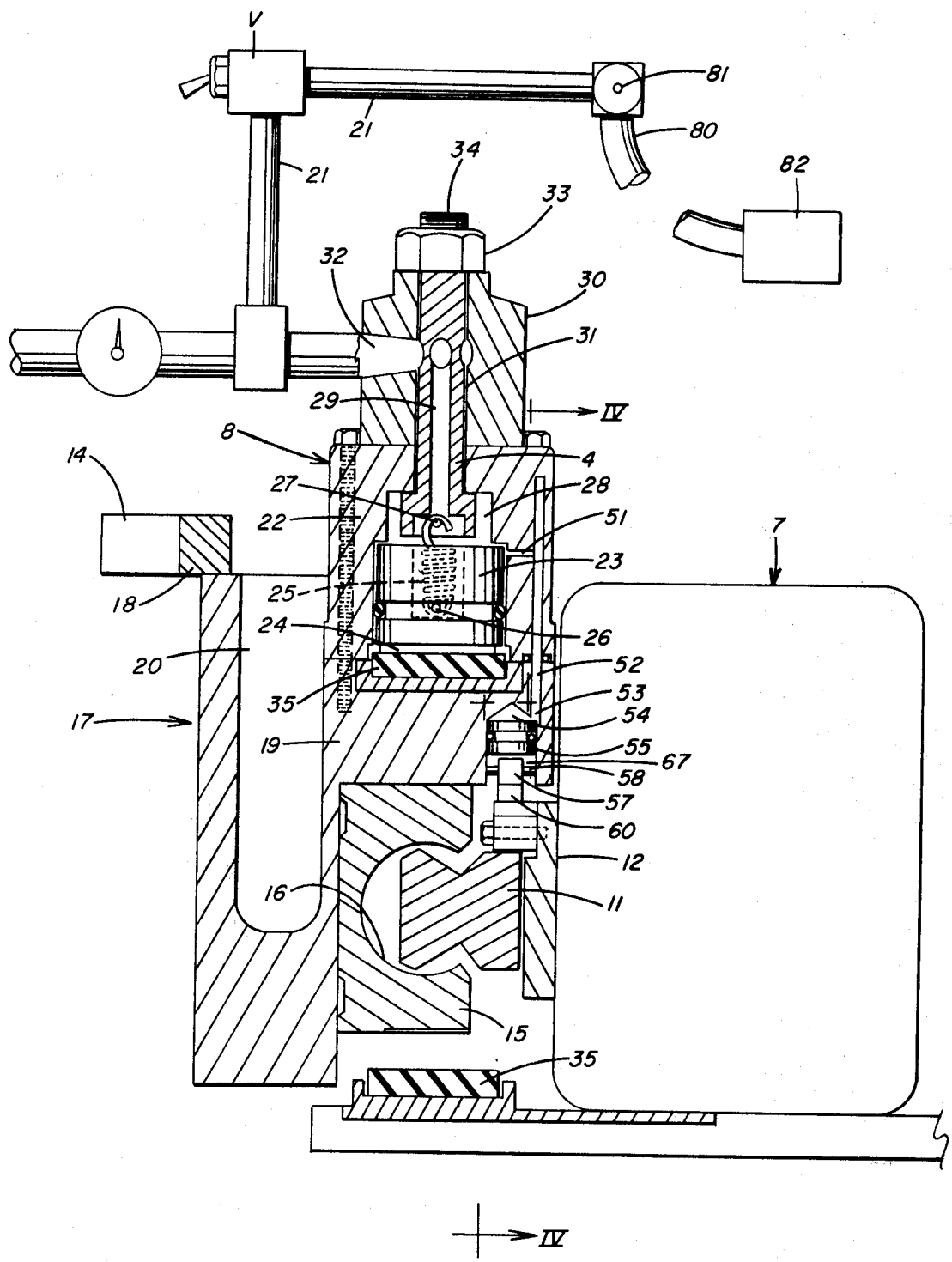
FIG. 3 is a vertical section on line III—III of FIG. 1.

A track 11 extends substantially throughout the length of the beam and is attached to a plate 12 which is fixed to the beam. The track has a stop 13 on its end located in storage section 10 to retain the heads on the beam. With reference to FIG. 3, each carrier head 8 has a bearing member 15 formed with a channel 16 cooperating with track 11 so that the carrier head can be moved along the beam. The bearing member carries a mounting bracket 17 having a projection 19 which overlies the bearing member and is attached to the bearing member. Mounting bracket 17 is formed with a slot 20 which is adapted to receive apparatus to be mounted in the bracket. A lip 18 is located at the upper end of the mounting bracket and extends in a direction away from projection 19 and slot 20. The lip is formed with a horizontal slot 14 to receive a hold down screw which is tightened to firmly hold apparatus in the mounting bracket.

Each carrier head includes a member 22 bolted to projection 19 and formed with a chamber 28 having a piston 23 located therein. Piston 23 has a friction pad 24 at its lower end which contacts a horizontally moving continuous belt 35 passing through the carrier head when pressure is applied to the upper end of the piston to move it downwardly. A retraction spring 25 extends between a pin 26 on piston 23 and a pin 27 on the enlarged lower end of a cylindrical member 4 extending upwardly through member 22. The retraction spring urges piston 23 in the upward direction when pressure is removed from the upper end of the piston. Member 4 has a longitudinal passageway 29 formed therein which provides communication between chamber 28 and an inlet 32 to supply pressurized fluid to the top of piston 23 to move the piston downwardly. A cap 30 is located on top of member 22 and a passageway 31 is formed therein which receives the upper end of member 4. Cap 30 is held in position on member 22 by a nut 33 threaded to the upper end 34 of member 4.

Pressurized fluid is supplied to the top of piston 23 in chamber 28 through inlet passageway 32 and longitudinal passageway 29 in member 4. The fluid is supplied to inlet 32 from a source 82 through a hose 80, a swivel 81 and piping 21 having an on-off valve V.

A continuous flexible belt 35 extends around sheaves located at opposite ends of beam 7. The sheaves are formed with teeth and the belt is formed at its edges with spaced teeth which cooperate with the teeth on the sheaves. A drive sheave 36 is located in a housing 37 at the end of storage section 10 of the beam, and an idler sheave 46 is located at the opposite end of beam 7. Drive sheave 36 is attached to a rotatably mounted shaft 39 by a key 38. The shaft has a hand wheel 40 at one end to manually rotate the shaft and sheave 36 to drive continuous belt 35. While a hand wheel is shown on shaft 39, it will be understood by those skilled in the art that shaft 39 may be driven by power means such as an electric motor or a hydraulic motor. When sheave 36 is rotated, teeth 41 on the sheave coact with the teeth on the inner edges of the belt to move the belt.

A well known digital readout counter 43 is located on shaft 39 between hand wheel 40 and cover 44 of housing 37. The counter converts the number of revolutions of shaft 39 and sheave 36 into a number indicating the linear distance of travel of belt 35 along beam 7 transversely of table 2. The reading on counter 43 indicates the linear distance which a carrier head 8 has moved along beam 7 by belt 35 and thereby permits determination of the exact position of apparatus in the mounting bracket on the carrier head relative to the width of table 2 and to material passing over the table. Thus, when the hand wheel is rotated to move the belt linearly, the distance the belt has been moved is readily observable by the machine operator. A clutch and brake assembly 45 for shaft 39 as shown in FIG. 5 is located within hollow beam 7 at the end of storage section 10. This assembly locks shaft 39 and sheave 36 in position after all of the carrier heads are in the desired relative positions along beam 7. Locking of shaft 39 and attached sheave 36 insures that there will be no movement of the belt or the heads after the heads are properly positioned. The clutch portion of the assembly also insures that there will be no longitudinal movement of shaft 39 relative to digital readout counter 43 while the heads are being positioned along beam 7 since longitudinal movement of the shaft can adversely affect the accuracy of the digital readout on the counter.

With further reference to FIG. 5 of the drawings, it will be seen that housing 37 is supported on a transition member 56 which is screwed to beam 7. Bearings 42 for shaft 39 are carried in housing 37. Supports and additional bearings 47 for shaft 39 are carried by the transition member. The clutch and brake assembly has a plurality of adjacent discs 48 located within a cylindrical member 49 having a locking knob 50 threaded in its outer end. When locking knob 50 is tightened in member 49, discs 48 are compressed to lock shaft 39 against rotation. The clutch and brake assembly used in my invention is a Hillard No. L2-1-313 and the specific assembly thereof forms no part of my invention.

With specific reference to FIG. 3, each carrier head is provided with a port 51 formed in member 22 and extending from chamber 28 to a passageway 52 extending downwardly in member 22 to communicate with a passageway 53 formed in projection 19 on mounting bracket 17. Passageway 53 communicates with a chamber 54 formed in projection 19. A piston 55 is located in chamber 54 so that when pressure is applied on its top it will move downwardly and extend partially out of chamber 54. The location of port 51 relative to the upper end of piston 23 in chamber 28 is such that the downward movement of piston 23 required to bring friction pad 24 into contact with belt 35 exposes the inlet end of port 51 and permits pressurized fluid to flow through passageway 52 to chamber 54 and contact the upper end of piston 55 and move the piston downwardly. As piston 55 moves downwardly the bottom surface of the piston contacts one end of a latch lever 57, shown in FIG. 4, to pivot the latch lever about a pin 58 which mounts the lever in a slot 67 formed in projection 19 of the carrier head. The latch lever has a pawl 59 at one end which is hooked over the end of an elongated stop 60 when the head is located in storage section 10 of beam 7 immediately adjacent to guide rolls 5. Stop 60 is attached to plate 12 on beam 7 by a bolt 6 in a slot 62 to permit adjustment of the stop in a direction parallel to beam 7 so that the center line of the stop coincides with the edge of the material adjacent to guide rolls 5. This adjustment insures that the apparatus supported in the mounting bracket on the carrier head immediately adjacent to rolls 5 will not overhang the material on table 2 and interfere with its movement along the table. Additionally, adjustment of stop 60 insures that the position of the apparatus carried by the carrier heads coincides with the edge of the material and with guide rolls 5 which is essential for accurate location of the carrier heads along beam 7, since all measurements are referenced from this edge of the material.

Figure 4:
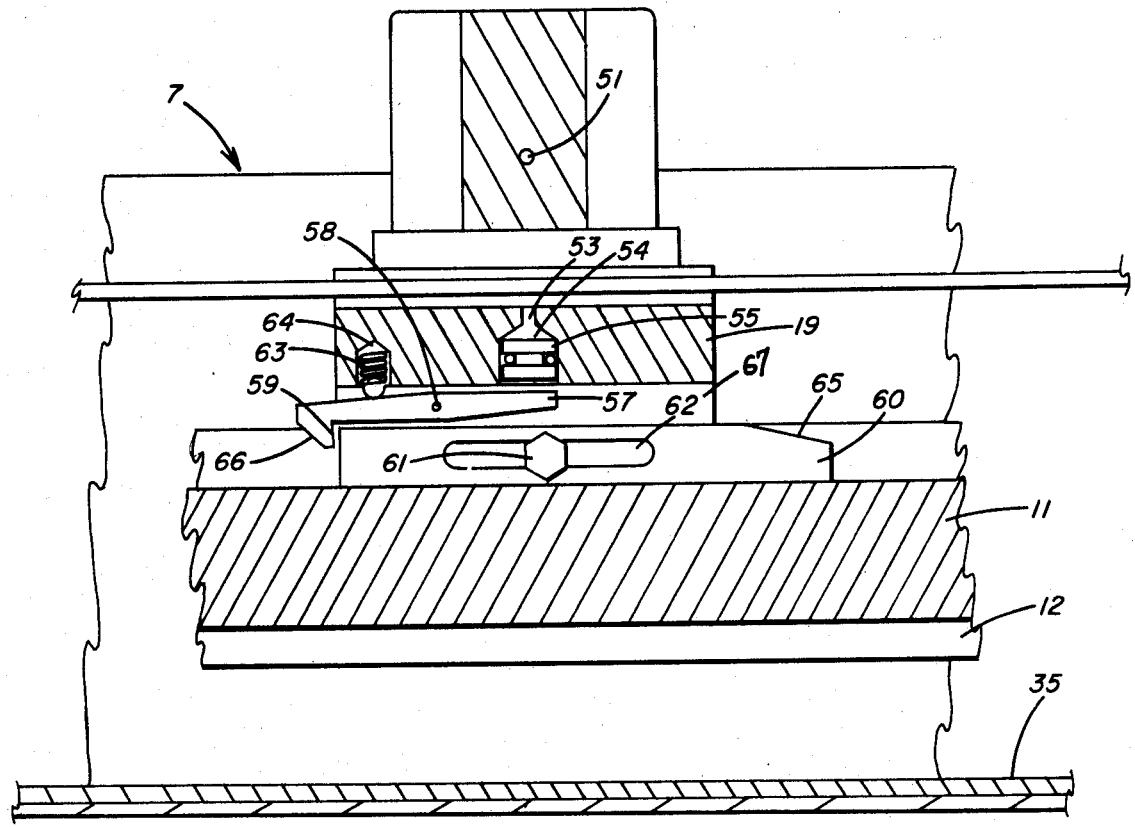
FIG. 4 is a section on line IV—IV of FIG. 3.

With further reference to FIGS. 3 and 4, it will be seen that when pressurized fluid flows into chamber 54 from passageway 53, it forces piston 55 downwardly to rotate latch lever 57 about pin 58 in a clockwise direction and raise pawl 58 away from stop 60 to permit the carrier head to be moved onto the portion of the beam over table 2 by belt 35 which is in contact with friction pad 24 on piston 23. A coil spring 63 extends downwardly from a recess 64 in projection 19 above slot 67 and contacts latch lever 57 to constantly urge the latch lever in a counterclockwise direction about pin 58 to hold pawl 59 in latching contact with stop 60. When piston 55 overcomes the force of spring 63 to compress it sufficiently to permit pawl 59 to disengage the end of the stop, the head is moved along beam 7 over the table. The end of stop 60 facing guide rolls 5 is formed with a bevel 65 which cooperates with a bevel 66 formed on latch lever 57 at pawl 59 so that when a carrier head is returned to storage section 10 of beam 7 by movement of belt 35, the latch lever will pivot about pin 58 to permit the carrier head to slide past stop 60 into the storage section.

Figure 6:
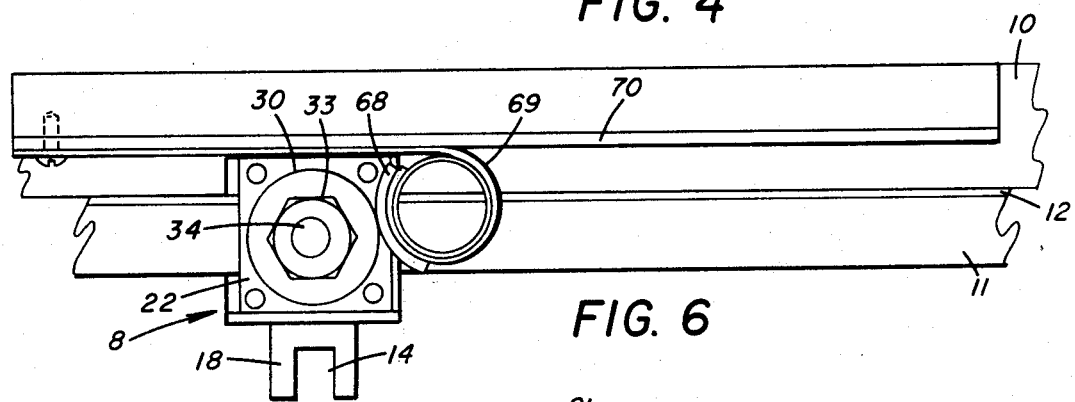
FIG. 6 is a plan view of the outermost carrier head.

With reference to FIGS. 1, 2 and 6 of the drawings, it will be seen that the carrier head on storage section 10 located closest to stop member 13 has a semicircular clip 68 with a coil spring 69 in contact therewith. The coil spring is a constant force spring sold by Auetek/Hunter Spring under the trademark Neg-a-Tor. A vertical guide 70 is attached to the top of beam 7 in storage section 10 to prevent coil spring 69 from buckling, and the end of spring 69 is attached to the guide. The spring tends to drive the last carrier head in the storage section and all other heads located in the storage section toward stop 60 until latch lever 57 on the head closest to the exit end of the storage section contacts stop 60 to prevent further movement of the heads until the latch lever on that head is pivoted to release the pawl and permit the head to move onto the section of the beam over table 2. This arrangement insures that all of the heads in the storage section are constantly forced toward stop 60 and hence will be moved over the table when pressure is supplied to chamber 28 to move the piston 23 in the head downwardly to force friction pad 24 into contact with belt 35 and to simultaneously lift pawl 57 from stop 60.

Figure 7:
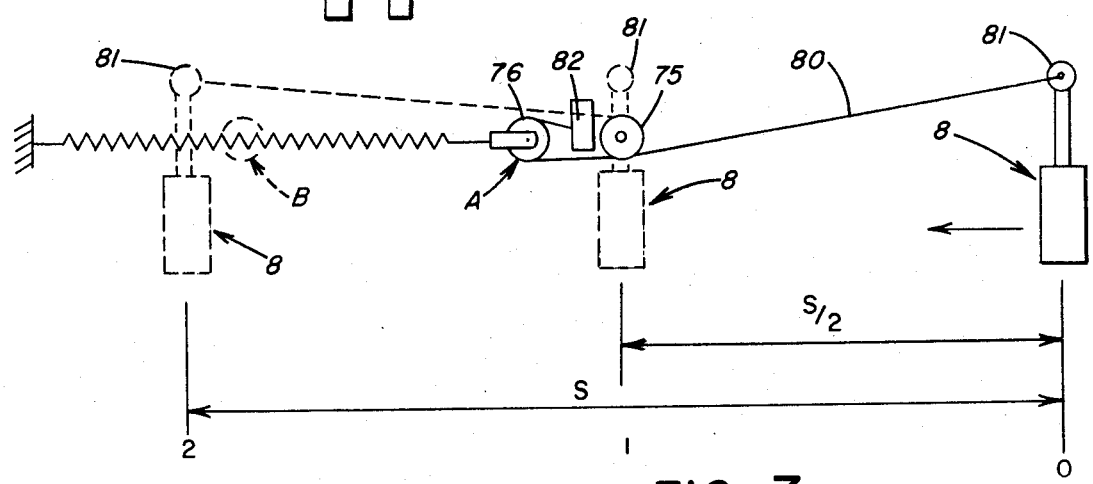
FIG. 7 is a schematic view of a takeup arrangement.

FIG. 7 is a schematic illustration of a single carrier head 8 and the manner in which the head is arranged and connected with a source of pressurized fluid to permit movement of the head along beam 7. A hose 80 extends from a swivel 81 on carrier head 8 around a fixed sheave 75 and a takeup sheave 76 to a source of pressurized fluid 82. The takeup sheave is resiliently mounted such as by a spring or a spring powered reel. When the carrier head is at position "O" in FIG. 7, the takeup sheave is at positon "A." When the carrier head moves a distance S/2 along beam 7 to a position marked "1" in FIG. 7 which is the approximate mid-point of beam 7, takeup sheave 76 moves to the left as spring 83 contracts. When the carrier head is at position "1," takeup sheave 76 is at the dotted position indicated "B"

in FIG. 7. When the carrier head continues to move along beam 7 through distance "S" to position "2" in FIG. 7, takeup sheave 76 moves toward its initial position since a length of hose 80 is now available to permit spring 83 to contract so that when the head arrives at position "2" in FIG. 7, takeup sheave 76 is at position "A" with hose 80 extending from fluid source 82 at fixed sheave 75 over takeup sheave 76 to swivel 81 on the head.

It is important that each hose 80 be in a substantially taut condition at all times since otherwise a hose could interfere with the movement of the heads along beam 7 or with the operation of the apparatus carried by the carrier head. The taut condition of each hose is insured by utilizing an arrangement such as shown in FIG. 7 for each head wherein any motion of a head along the beam equals one-half the motion of the takeup sheave. While the specific takeup arrangement shown in FIG. 7 is incorporated in my invention, it will be understood by those skilled in the art that other arrangements can be used so long as the hoses are maintained in a substantially taut condition at all times.

In the operation of my invention, belt 35 slides freely through all of the carrier heads until it is desired to move the first head out of storage section 10 onto a portion of the beam extending over table 2. The head is then fixed to the belt by supplying fluid pressure to the upper end of piston 23 in chamber 28 to force the piston downwardly and effect contact between the belt and friction pad 24. The fluid is supplied to inlet passageway 32 in cap 30 by opening valve V located in the piping supplying the head to be moved. After the first head is positioned at the desired location along beam 7 over the table, the pressure on piston 23 is released and the piston is raised by spring 25 to terminate the contact between pad 24 and the belt. The next carrier head is now actuated by moving its friction pad 24 into contact with the belt and the head is moved out of the storage section into position along beam 7. The location of each successive carrier head along beam 7 being determined by the reading on digital counter 43. When all of the carrier heads are properly positioned along beam 7, belt 35 is locked in place by tightening knob 50 to prevent movement of sheave 36 and the heads are clamped to the belt. The apparatus on the heads are held in position to perform their function on the material passing over the table.

While I have described preferred embodiments of my invention herein, it is to be understood that it may be embodied within the scope of the appended claims.

I claim:

1. In apparatus for treating material including a table having idler rolls to support the material, a drive roll to move the material over said idler rolls, vertical rolls at an edge of said table to guide the material as it passes over the idler rolls, an elongated beam extending across and spaced above the table and a track attached to and extending substantially throughout the length of said beam, the improvement comprising a plurality of independently adjustable carrier heads supported on said track for movement along the length of said beam, each of said carrier heads having a bracket attached thereto adapted to support apparatus for treating material as the material passes over said table below said beam, drive means independently engageable with each of said carrier heads to individually move the head with which it is engaged along said track to position said carrier head along said beam over said table, means on each of said carrier heads to engage and disengage said carrier head with said drive means, means operatively connected with said drive means to determine the linear distance each carrier head is moved along said track over said table by said drive means, a carrier head storage section on said beam extending in cantilever relationship past said edge of said table having said vertical rolls, stop means on said beam located adjacent said edge of said table to prevent carrier heads from moving onto the portion of said beam over said table, adjustable means on each of said carrier heads to contact said stop means, and means on each of said carrier heads to release said adjustable means to permit the carrier head to pass said stop means onto the portion of said beam over said table.

2. The improvement set forth in claim 1 wherein said drive means is a continuous belt, an idler sheave at one end of said beam, a drive sheave at the other end of said beam, means for rotating said drive sheave, said continuous belt passing around said sheaves and extending substantially parallel to said beam, said drive sheave connected with said means to determine the linear distance each carrier head is moved along said track.

3. The improvement set forth in claim 2 wherein each of said carrier heads has a first chamber formed therein, said means to engage and disengage said carrier head with said drive means is a piston located in said first chamber, means connecting said first chamber with a source of pressurized fluid, a friction pad on an end of said piston, said belt passing through said first chamber in each of said carrier heads with a surface adjacent said friction pad, whereby application of fluid to said piston moves said piston to force said friction pad into contact with said surface of said belt to move said carrier head along said track when said belt is moved.

4. The improvement set forth in claim 3 wherein each of said carrier heads has a second chamber formed therein in fluid communication with said first chamber, a second piston in said second chamber located above said adjustable means to contact said adjustable means to release said adjustable means from said stop means, whereby movement of said first piston in said first chamber permits pressurized fluid to flow to said second chamber to move said second piston into contact with said adjustable means to release said adjustable means from said stop means and thereby permit said carrier head to move out of said storage section onto the portion of said beam over said table.

5. The improvement set forth in claim 1 wherein each of said carrier heads is connected to a source of pressurized fluid, valve means to individually and independently control the passage of pressurized fluid from said source of fluid to each of said carrier heads, each of said carrier heads having a chamber connected with said source of pressurized fluid, a piston in said chamber, a friction pad on an end of said piston, and wherein said drive means is a continuous belt passing through said chamber in each of said carrier heads adjacent said friction pad, whereby passage of pressurized fluid to said chamber moves said piston to force said friction pad into contact with said continuous belt so that movement of said belt moves said carrier head.

6. The improvement set forth in claim 1 including spring means in said storage section of said beam, one end of said spring means attached to said beam and the other end of said spring means contacting a carrier head in said storage section to urge said carrier head toward said stop means.

7. A carrier head adapted to be supported on a track for movement along the track, said carrier head having a first chamber formed therein, a piston located in said first chamber adapted to engage and disengage said carrier head with a drive means, means adapted to connect said first chamber with a source of pressurized fluid to move said piston, a friction pad on an end of said piston adapted to contact a drive means, a second chamber formed in said carrier head in fluid communication with said first chamber, latch means on said carrier head adapted to contact a stop means, and a second piston in said second chamber adapted to contact said latch means, whereby application of pressure to said piston moves said piston to force said friction pad toward a drive means for said carrier head and to permit pressurized fluid to flow to said second chamber to move said second piston into contact with said latch means.

* * * * *